(12) United States Patent
Miyagi (10) Patent No.: US 10,821,550 B2
(45) Date of Patent: Nov. 3, 2020

(54) WELDING APPARATUS AND WELDING QUALITY INSPECTION METHOD

(71) Applicant: HITACHI, LTD., Tokyo (JP)

(72) Inventor: Masanori Miyagi, Tokyo (JP)

(73) Assignee: HITACHI, LTD., Tokyo (JP)

(*) Notice: Subject to any disclaimer, the term of this patent is extended or adjusted under 35 U.S.C. 154(b) by 217 days.

(21) Appl. No.: 15/573,335

(22) PCT Filed: Mar. 9, 2016

(86) PCT No.: PCT/JP2016/057424
§ 371 (c)(1),
(2) Date: Nov. 10, 2017

(87) PCT Pub. No.: WO2016/181695
PCT Pub. Date: Nov. 17, 2016

(65) Prior Publication Data
US 2018/0099356 A1    Apr. 12, 2018

(30) Foreign Application Priority Data

May 11, 2015 (JP) ................. 2015-096319

(51) Int. Cl.
*B23K 26/03* (2006.01)
*B23K 26/211* (2014.01)
(Continued)

(52) U.S. Cl.
CPC .......... *B23K 26/211* (2015.10); *B23K 26/032* (2013.01); *B23K 26/26* (2013.01); *B23K 26/702* (2015.10)

(58) Field of Classification Search
CPC .. B23K 26/211; B23K 26/702; B23K 26/032; B23K 26/03; B23K 26/044;
(Continued)

(56) References Cited

U.S. PATENT DOCUMENTS 6,060,685 A * 5/2000 Chou ................... B23K 26/032
219/121.83
2004/0124227 A1    7/2004 Seki et al.
(Continued)

FOREIGN PATENT DOCUMENTS

DE    102010017316 A1    12/2010
DE    102010021596 A1    12/2011
(Continued)

OTHER PUBLICATIONS

Extended European Search Report dated Feb. 1, 2019 for the European Patent Application No. 16792420.8.
(Continued)

*Primary Examiner* — Charles Cheyney
(74) *Attorney, Agent, or Firm* — Volpe Koenig (57) ABSTRACT

A welding apparatus includes: a laser beam irradiation section that emits a laser beam; a spectroscopic apparatus that receives plasma emission from a molten pool formed by laser beam irradiation, and acquires optical spectral information; and an estimation section that estimates material components of a weld zone on the basis of the optical spectral information, and estimates a property of the weld zone on the basis of the material components.

8 Claims, 9 Drawing Sheets

(51) Int. Cl.
*B23K 26/70* (2014.01)
*B23K 26/26* (2014.01)

(58) Field of Classification Search
CPC .... B23K 26/242; B23K 26/26; B23K 31/125; B23K 2103/04; B23K 26/32
USPC ................. 219/121.83, 121.63, 121.64, 76.1
See application file for complete search history.

(56) References Cited

U.S. PATENT DOCUMENTS

| | | | |
|---|---|---|---|
| 2005/0011867 A1 | 1/2005 | Okuda et al. | |
| 2009/0208773 A1* | 8/2009 | DuPont | B22F 3/1055 428/610 |
| 2010/0133247 A1* | 6/2010 | Mazumder | B23K 9/02 219/121.83 |
| 2010/0183112 A1 | 7/2010 | Ashida et al. | |
| 2010/0326962 A1* | 12/2010 | Calla | B23K 9/0956 219/76.14 |
| 2011/0100967 A1* | 5/2011 | Yoo | B23K 26/032 219/121.73 |
| 2012/0285936 A1 | 11/2012 | Urashima et al. | |
| 2014/0027415 A1 | 1/2014 | Lin et al. | |
| 2015/0083697 A1 | 3/2015 | Werke et al. | |
| 2016/0052086 A1* | 2/2016 | Mazumder | B23K 26/032 219/121.83 |

FOREIGN PATENT DOCUMENTS

| | | |
|---|---|---|
| JP | 2000-210781 A | 8/2000 |
| JP | 2005-034885 A | 2/2005 |
| JP | 2012-236196 A | 12/2012 |
| WO | 2002/064304 A1 | 8/2002 |

OTHER PUBLICATIONS

International Search Report dated May 24, 2016 of International Application No. PCT/JP2016/057424.

* cited by examiner

| FERRITE CONTENT | 1.2% | 2.5% | 3.8% | 5.7% | 8.9% |
|---|---|---|---|---|---|
| PRESENCE/ABSENCE OF HOT CRACKING | PRESENT | PRESENT | ABSENT | ABSENT | ABSENT |

WELDING APPARATUS AND WELDING QUALITY INSPECTION METHOD

TECHNICAL FIELD

The present invention relates to a welding apparatus and a welding quality inspection method.

BACKGROUND ART

Laser welding capable of deep penetration welding can perform welding with higher accuracy and at higher speed than those of conventional arc welding, and has recently grown in use and popularity. Generally, in the laser welding, changes in a depth of penetration and a melt amount and flaws such as cracks and blow holes are generated due to the influence of a surface state and components of a material, workpiece setup accuracy, and the like.

Since welding failures such as cracks, non-deposition, and an insufficient depth of penetration in the laser welding portion become fatal flaws to products, it is imperative to avoid the outflow of defective products. To address the problem, there has been proposed, as a method of evaluating a welding quality, a method of detecting plasma emission generated in a molten pool and monitoring a depth of penetration. For example, an apparatus described in Patent Document 1 is aimed to measure a depth of penetration by irradiating a weld zone with an object beam different in a wavelength from a laser beam and causing an optical interferometer to receive the object beam reflected by a bottom of a keyhole.

PRIOR ART DOCUMENT

Patent Document

Patent Document 1: JP-2012-236196-A

SUMMARY OF THE INVENTION

Problem to be Solved by the Invention

While Patent Document 1 evaluates the depth of penetration as the welding quality, it is often necessary to evaluate a welding quality other than the depth of penetration depending on members to be welded and a usage. For example, if materials to be welded are austenite stainless steels, a content of a ferrite phase is important for suppressing hot cracking.

Means for Solving the Problem

According to a first aspect of the present invention, a welding apparatus includes: a laser beam irradiation section that emits a laser beam; a spectroscopic apparatus that receives plasma emission from a molten pool formed by laser beam irradiation, and acquires optical spectral information; and an estimation section that estimates material components of a weld zone on the basis of the optical spectral information, and estimates a property of the weld zone on the basis of the material components.

According to a second aspect of the present invention, a welding quality inspection method implemented at a time of welding by a laser beam includes: acquiring optical spectral information on plasma emission generated in a molten pool; estimating material components of the molten pool on the basis of the optical spectral information; and estimating a property of the weld zone on the basis of the material components.

Effect of the Invention

According to the present invention, it is possible to appropriately manage the property of the weld zone.

MODES FOR CARRYING OUT THE INVENTION

Embodiments of the present invention will be described hereinafter with reference to the drawings.

First Embodiment

Figure 1:
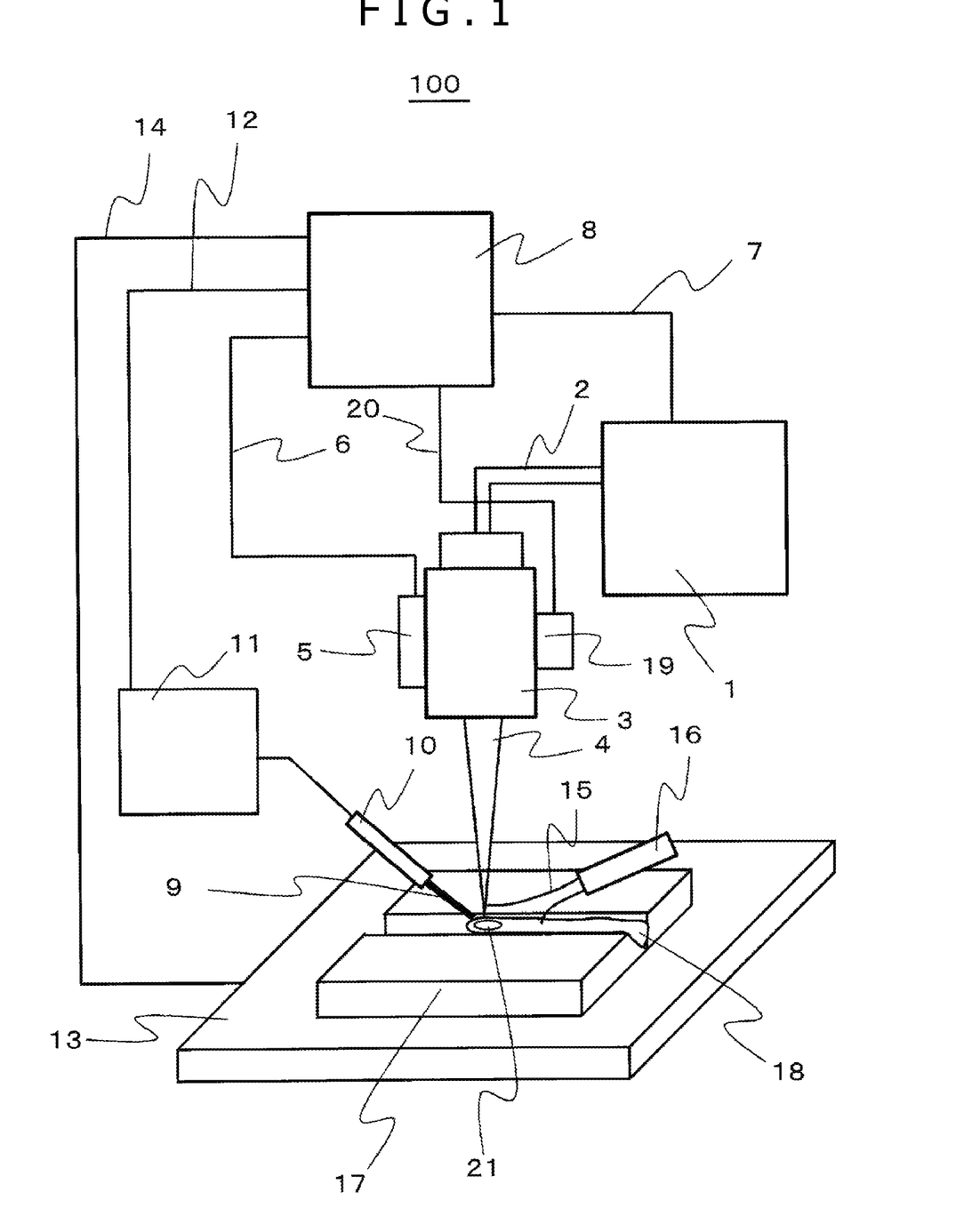
FIG. 1 is a pattern diagram illustrating an example of a welding apparatus according to a first embodiment.

FIG. 1 is a pattern diagram illustrating an example of a welding apparatus according to a first embodiment. A welding apparatus 100 includes a laser oscillator 1, a laser head 3 that is a light collection optical system, a spectroscopic apparatus 5, a welder control section 8, a filler metal feeder 11, a molten pool observation camera 19, a working table 13, a filler metal feed nozzle 10, a shielding gas nozzle 16, and the like.

A laser beam generated by the laser oscillator 1 is transferred to the laser head 3 through an optical fiber 2. The laser beam 4 collected by the laser head 3 is radiated to workpieces to be welded 17 placed on the working table 13. The working table 13 is movable in an x direction and a y direction, and the laser beam 4 can be scanned on the workpieces to be welded 17 by moving the working table 13. It is noted that the laser beam 4 may be scanned by moving the laser head 3 relatively to the working table 13.

A molten pool 21 is formed on the workpieces to be welded 17 by irradiation of the laser beam 4. A filler metal 9 fed from the filler metal feeder 11 is fed to the molten pool 21 through the filler metal feed nozzle 10. Furthermore, shielding gas 15 is blown toward the molten pool 21 from the shielding gas nozzle 16. The laser oscillator 1, the filler metal feeder 11, and the working table 13 are connected to the welder control section 8 by signal cables 7, 12, and 14, respectively and each operate in response to a signal from the welder control section 8.

The spectroscopic apparatus 5 and the molten pool observation camera 19 are provided on the laser head 3. The laser head 3 is equipped with an optical system that transmits the laser beam from the laser oscillator 1 and that reflects a beam at a wavelength other than a wavelength of the laser beam to the spectroscopic apparatus 5. Owing to this, a plasma beam generated in the molten pool 21 is guided to the spectroscopic apparatus 5 coaxially with the laser beam 4 through the laser head 3. Spectroscopic information (spectral intensity) about the plasma beam obtained by the spectroscopic apparatus 5 is sent to the welder control section 8 through an optical sensor signal cable 6. Moreover, the molten pool observation camera 19 observes the molten pool 21 coaxially with the laser beam 4. Molten pool image information is sent to the welder control section 8 through a molten pool observation camera cable 20.

In the present embodiment, 304 austenitic stainless steels with a V-groove formed therebetween are used as the workpieces to be welded 17. A 304 austenitic stainless steel higher in a Cr content than a base material is used as the filler metal 9 and a shape thereof is a wire shape. Furthermore, a disk laser beam at a wavelength of about 1030 nm is used as the laser beam 4. Nitrogen gas is used as the shielding gas 15. Generally, when the 304 stainless steels are welded together, the nitrogen gas is often used as the shielding gas 15 from the viewpoint of suppression of porosities. This is because the nitrogen gas is absorbed by a weld metal and, therefore, higher suppression of the porosities is possible. However, nitrogen is an austenite stabilizing element. Owing to this, if a large amount of nitrogen is dissolved in a weld zone 18, an austenite phase is stabilized and a ferrite phase is hardly produced in a structure of the weld zone 18. Since a number of impurities such as phosphorus and sulfur that induce hot cracking are dissolved in the ferrite phase, it is important to contain about 5 to 10% of the ferrite phase from the viewpoint of suppression of hot cracking.

Therefore, in the present embodiment, the welding apparatus 100 is configured to estimate a property of the weld zone 18 on the basis of the spectroscopic information obtained by the spectroscopic apparatus 5. The welder control section 8 can calculate the property of the weld zone 18 (composition of the weld metal) by comparing the spectroscopic information from the spectroscopic apparatus 5 with reference spectroscopic information acquired in advance. In the present embodiment, the filler metal 9 is added to the molten pool 21. Owing to this, the components of the weld zone 18 differ from those of the workpieces to be welded 17 and are useful information to grasp the property and a state of the weld zone 18.

A ferrite content (percentage of the ferrite phase) in the weld zone 18, that is, the ferrite content in the weld metal depends on a solidification condition including a cooling speed and a temperature gradient as well as the components. Assuming that the solidification condition is generally constant if a welding condition is constant, it is possible to estimate the ferrite content when the components are known. As a method of estimating the ferrite content in the weld metal, there is normally known a method of estimation from a constitution diagram (for example, Schaffler Diagram). With the method using the constitution diagram, exponents of austenite forming elements (C, Mn, Ni, and N) are numerically calculated as an Ni equivalent and exponents of ferrite forming elements (Cr, Mo, Si, and Nb) are numerically calculated as a Cr equivalent from the composition of the weld metal obtained by spectroscopic measurement, and the Ni equivalent and the Cr equivalent are applied to the constitution diagram, thereby estimating the ferrite content.

Figure 2:
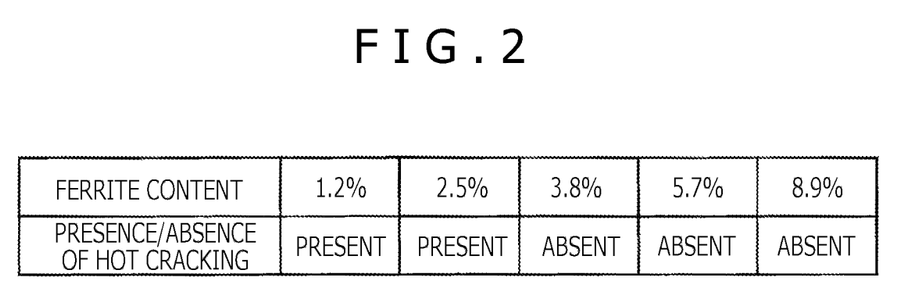
FIG. 2 illustrates correlation data in a table.

Such estimation of the ferrite content is performed by the welder control section 8. There is a correlation between the ferrite content and the hot cracking. FIG. 2 illustrates correlation data on the welding under the conditions described above. By holding such correlation data between the ferrite content and the hot cracking in the welder control section 8 in advance, it is possible to estimate the hot cracking by estimation of the ferrite content. According to FIG. 2, the hot cracking is suppressed with the ferrite content equal to or higher than 3.8%, which indicates that the ferrite content equal to or higher than 3.8% suffices in the laser welding according to the present embodiment.

Moreover, the hot cracking is greatly influenced by such trace impurity elements as S (sulfur) and P (phosphorus). Owing to this, by detecting the components of the workpieces to be welded 17 before welding with the present scheme, it is possible to estimate the hot cracking from a relationship between trace elements and the ferrite content. In other words, evaluating a hot cracking susceptibility to S and P contents and the ferrite content enables in-process estimation of the hot cracking with higher accuracy. Furthermore, it may be confirmed whether the weld zone 18 has the composition as set by irradiating the the weld zone 18 with a laser beam after welding.

Moreover, it is often difficult to grasp an actual degree of melt only from component information. If the components fall within predetermined ranges despite an extremely low volume of the weld zone 18, it is determined that the weld zone 18 is non-defective in respect to the hot cracking. Nevertheless, a desired dimension of the weld zone 18 is not achieved. To address the problem, therefore, the molten pool observation camera 19 is provided to measure the dimension of the molten pool 21 in the present embodiment. While a CCD camera is employed as the molten pool observation camera 19 in the present embodiment, the molten pool observation camera 19 is not limited to this type.

Figure 3:
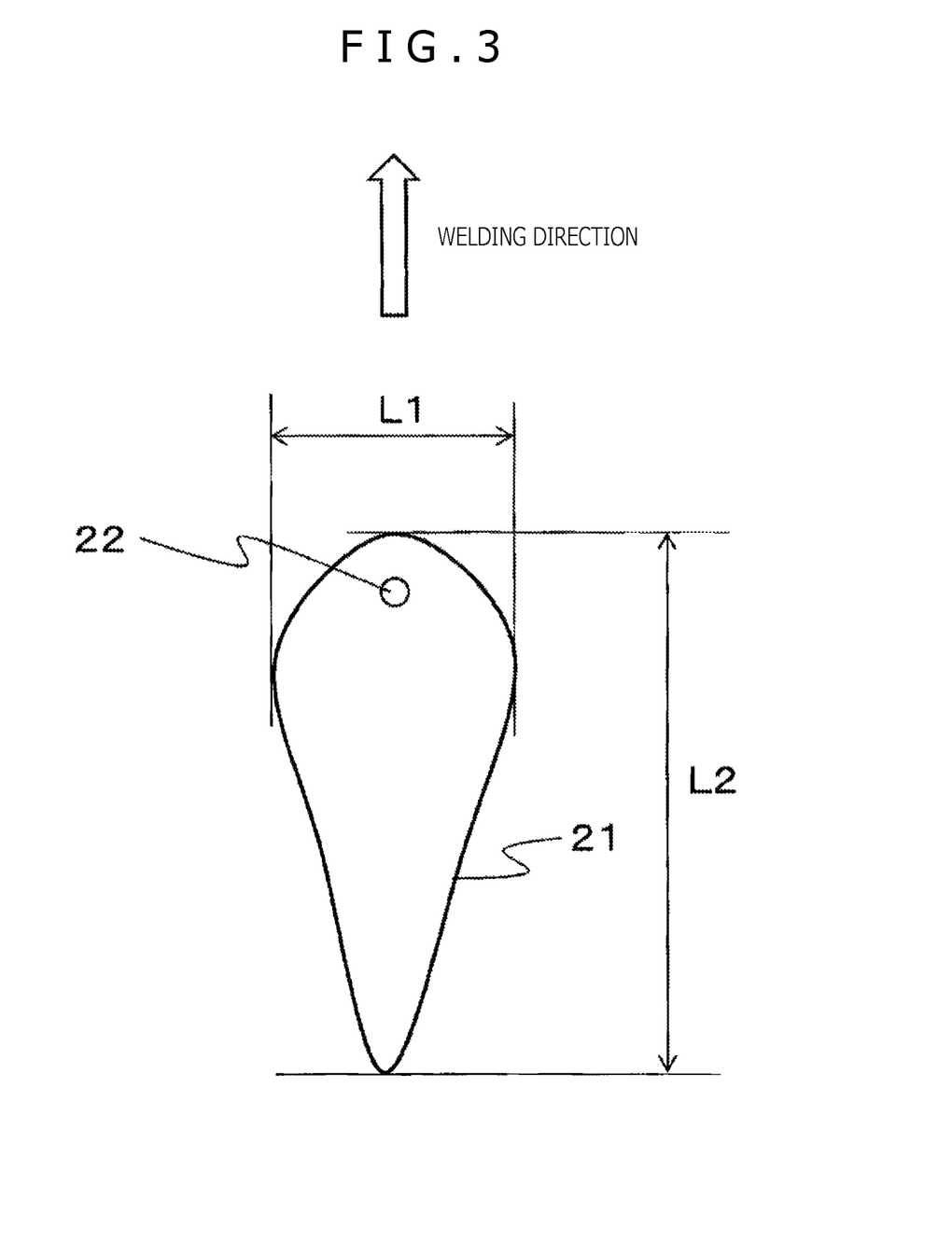
FIG. 3 is a pattern diagram illustrating an example of a molten pool.

FIG. 3 is a pattern diagram illustrating an example of the molten pool 21. A keyhole 22 is formed at a position of the molten pool 21 at which the molten pool 21 is irradiated with the laser beam 4. The laser beam 4 is collected by the light collection system and energy concentrates on a microscopic region (work point). Owing to this, a molten metal at the work point is remarkably evaporated and a recess (hole) is formed in the molten pool 21 by a reaction force thereto. This recess is referred to as "keyhole." In the example shown in FIG. 3, a welding direction is a direction indicated by an arrow (upward direction in FIG. 3). Reference character L1 denotes a width dimension of the molten pool 21, and reference character L2 denotes a length dimension of the molten pool 21.

The welder control section 8 calculates the width dimension L1 and a length dimension L2 of the molten pool 21 from the molten pool image information by the molten pool observation camera 19. A dimension of the weld zone 18 can be estimated from the width dimension L1 and the length dimension L2 of the molten pool 21. A storage section (not shown) of the welder control section 8 stores ranges of the width dimension and the length dimension of the molten pool 21 for sound welding in advance. The welder control section 8 calculates the dimensions L1 and L2 of the molten pool 21 from the molten pool image information by the molten pool observation camera 19 and compares the dimensions L1 and L2 with the dimension ranges in a case of the sound welding, thereby making it possible to evaluate a failure/no-failure (soundness) of the weld zone 18.

While the soundness of the weld zone 18 is evaluated on the basis of a magnitude of a range of the molten pool 21, the width dimension L1 and the length dimension L2 are adopted as indexes of the magnitude of the range of the molten pool 21 herein. Alternatively, an area of the molten pool 21, for example, may be estimated from the molten pool image information and the soundness of the weld zone 18 may be evaluated from a magnitude of the area.

Furthermore, laser power, a welding speed (laser beam scanning speed), and a feed rate of the filler metal are sequentially controlled on the basis of the obtained information on the ferrite content and the obtained molten pool dimension, thereby making it possible to optimize the ferrite content and the molten pool dimension.

Figure 4:
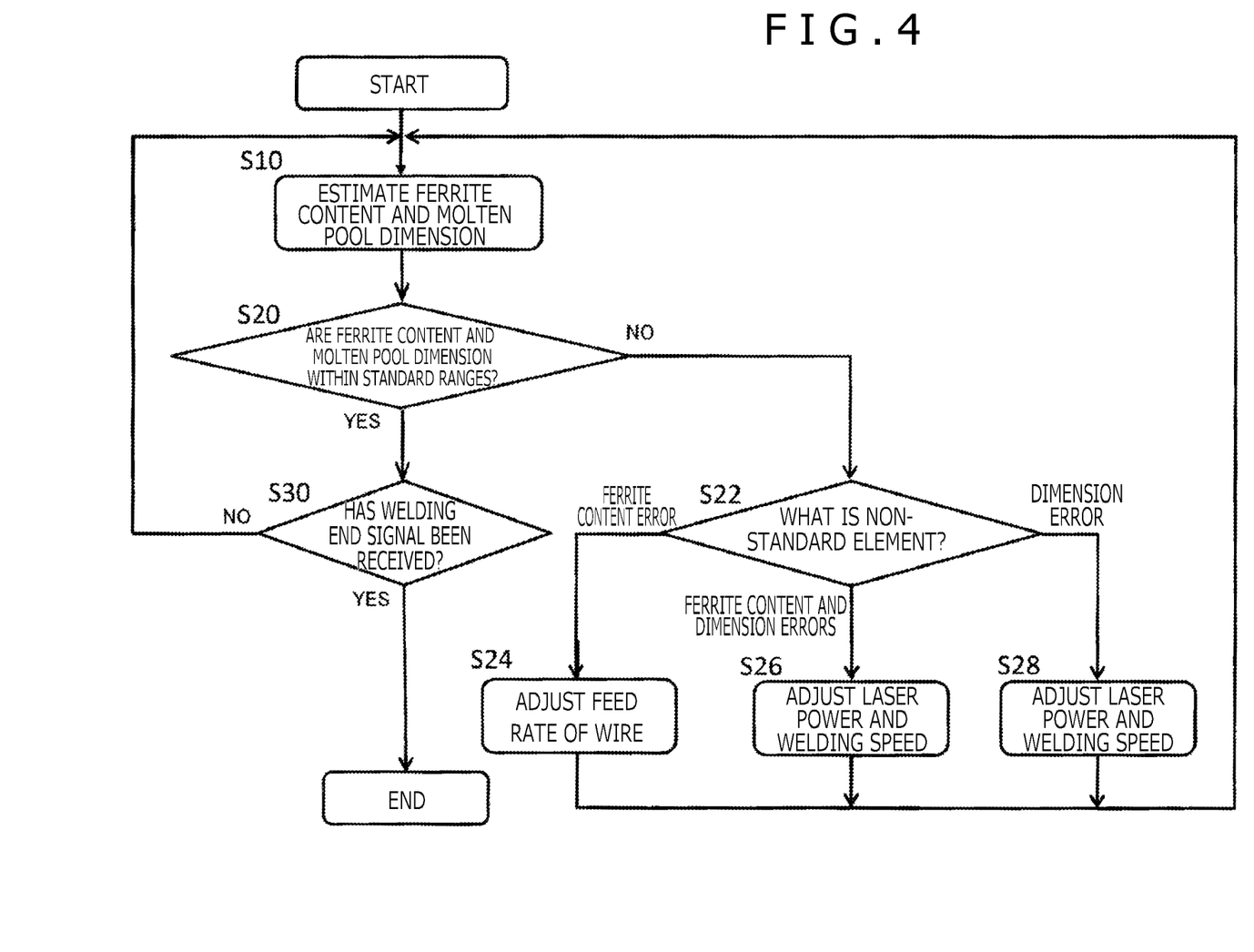
FIG. 4 is a chart illustrating a control flow for keeping optimum a ferrite content and a molten pool dimension.

FIG. 4 is a chart illustrating a control flow for keeping optimum the ferrite content and the molten pool dimension. This control process is executed by the welder control section 8 and is started by starting welding. In Step S10, the welder control section 8 estimates the ferrite content and the dimensions L1 and L2 of the molten pool 21 on the basis of the spectroscopic information on the plasma beam and the molten pool image information on the molten pool 21. In Step S20, the welder control section 8 determines whether the ferrite content and the dimensions L1 and L2 estimated in Step S10 are each within standard ranges.

When the ferrite content and the dimensions L1 and L2 are within the standard ranges in step S20, the welder control section 8 proceeds to Step S30. When at least either the ferrite content or the dimensions L1 and L2 are not within the standard ranges in step S20, the welder control section 8 proceeds to Step S22. In Step S30, the welder control section 8 determines whether a welding end signal has been received, and the welder control section 8 returns to Step S10 when the signal has not been received. On the other hand, when the welding end signal has been received, the welder control section 8 ends a series of processes.

On the other hand, when proceeding from Step S20 to Step S22, the welder control section 8 determines whether the no-standard (error) element is only the ferrite content, only the dimension, or both the ferrite content and the dimension. In other words, the welder control section 8 classifies an error into any of a ferrite content error, a dimension error, and ferrite content and dimension errors, and adjusts the welding condition in response to each of the errors.

In a case of only the ferrite content error, the welder control section 8 proceeds to Step S24 and adjusts a feed rate of a wire of the filler metal 9 by a predetermined rate. As described above, the 304 austenitic stainless steel higher in the Cr content than the base material is used as the filler metal 9, so that the ferrite content increases when the feed rate of the wire is increased, and the ferrite content decreases when the feed rate of the wire is reduced.

On the other hand, in a case of only the dimension error, the welder control section 8 adjusts either the laser power or the welding speed (scan speed of the laser beam 4) by a predetermined level, thereby adjusting the dimensions L1 and L2 of the molten pool 21. The dimensions L1 and L2 are reduced by reducing the laser power or increasing the welding speed. Conversely, the dimensions L1 and L2 are increased by increasing the laser power or reducing the welding speed.

When both the ferrite content and the dimension are not within the standard ranges, the laser power or the welding speed is adjusted first by the predetermined level and the dimensions L1 and L2 of the molten pool 21 are adjusted. The feed rate of the wire is then adjusted by a predetermined rate in order to adjust the ferrite content.

When ending processes in Step S24, S26, or S28, the welder control section 8 returns to Step S10 and estimates the ferrite content and the dimensions L1 and L2 of the molten pool 21 after adjustment. Proceeding again to Step S20, the welder control section 8 determines whether the ferrite content and the dimensions L1 and L2 are each within the standard ranges. When there is an error in either the ferrite content or the dimensions L1 and L2, the welder control section 8 proceeds again to Step S22 to perform an adjustment process. On the other hand, when the error is solved by the adjustment, the welder control section 8 proceeds to Step S30.

In this way, even when the welder control section 8 proceeds to Step S24, S26, or S28 and there is still an error after the adjustment, the welder control section 8 operates by a mechanism of repeating feedback control over the welding condition according to error classification. In the present embodiment, PID control is used as the feedback control, the ranges of the ferrite content and the molten pool dimension are set in advance to achieve desired welding, and the feedback control is exercised in such a manner that the ferrite content and the molten pool dimension are within the ranges. While the PID control is used as the feedback control, a control method is not limited to the PID control. In addition, while the disk laser beam is used as the laser beam 4, the laser beam 4 is not limited to the disk laser beam.

As described so far, the welding apparatus 100 includes: the laser head 3 that emits the laser beam 4; the spectroscopic apparatus 5 that receives the plasma emission from the molten pool 21 formed by laser beam irradiation, and acquires the optical spectral information; and the welder control section 8 that estimates material components of the weld zone 18 on the basis of the optical spectral information, and estimates the property of the weld zone 18 on the basis of the material components. For example, when the austenitic stainless steels that are the workpieces to be welded 17 are welded together while feeding the filler metal, then the ferrite content in the weld metal is estimated on the basis of the optical spectral information, and the hot cracking property (see FIG. 2) of the weld zone 18 is estimated on the basis of the ferrite content. Since the property of the weld zone 18 is estimated on the basis of the optical spectral information as described above, it is possible to determine a failure/non-failure of the property of the weld zone 18 and appropriately manage the property of the weld zone 18 in an in-process manner.

While the conventional welding apparatus described in Patent Document 1 measures the depth of penetration (depth of the keyhole) using the interferometer, the conventional welding apparatus does not estimate the property (hot cracking property) of the weld zone on the basis of the spectroscopic information differently from the present embodiment. It is noted that Patent Document 1 describes estimating the material of the weld zone by measuring the plasma beam by a spectroscope. Nonetheless, this estimation information is used for appropriately controlling the depth of penetration and not for estimating the property of the welded zone differently from the present embodiment. Owing to this, the conventional welding apparatus is unable to evaluate the quality of the weld zone in a many-faceted manner differently from the present embodiment.

The welding apparatus may further include the molten pool observation camera 19 as a measuring section that measures the magnitude of the molten pool 21 (for example, the dimensions L1 and L2 of FIG. 3) in the weld zone 18. The welding apparatus further estimates the soundness of the weld zone 18 by determining whether the dimensions L1 and L2 of the molten pool 21 are within the dimension ranges within which the welded state can be determined as being sound, in addition to estimation of the property of the weld zone 18 based on the optical spectral information. Moreover, the welding apparatus can predict the hot cracking property of the weld zone with higher accuracy by referring to the dimensions L1 and L2 of the molten pool 21 for the optical spectral information. For example, when the molten pool 21 has a large dimension, the hot cracking tends to occur since a higher thermal stress is generated during solidification. Combining the optical spectral information with the dimension of the molten pool 21 makes it possible to estimate the property of the weld zone 18 with higher accuracy.

Furthermore, the feed rate of the filler metal and either the laser power or the laser beam scanning speed during the laser welding may be controlled in such a manner that the magnitude of the molten pool 21 and the ferrite content are each within the predetermined set ranges. By causing the welder control section 8 to exercise such control, it is possible to automatically ensure the quality of the weld zone.

Second Embodiment

The preceding first embodiment has been described while referring to a case of estimating the ferrite content during welding of 304 austenitic stainless steels by way of example. In a second embodiment, an example in which the present invention is applied to dissimilar metal welding will be described. A case in which pure Cu and pure Al are welded together will be described hereinafter. However, the workpieces to be welded are not limited to a combination of pure Cu and pure Al but may be a combination of any of, for example, copper or copper alloy, aluminum or aluminum alloy, a steel material, nickel or nickel alloy, cobalt or cobalt alloy, and chromium or chromium alloy.

A configuration of a welding apparatus is similar to that shown in FIG. 1 and description thereof is omitted herein. It is noted, however, that the filler metal is not used and lap welding is carried out such that an Al material is disposed on an upper side. In the dissimilar metal welding using a Cu material and the Al material, a very brittle intermetallic compound is formed in a weld zone and the compound causes reduction in a joint strength. It is, therefore, necessary to control an amount of the intermetallic compound. To address the challenge, a welding test is conducted while changing welding conditions, a relationship between a dilution rate and the joint strength of the weld zone is acquired in advance, and the relationship is stored in the storage section of the welder control section 8.

Figure 5:
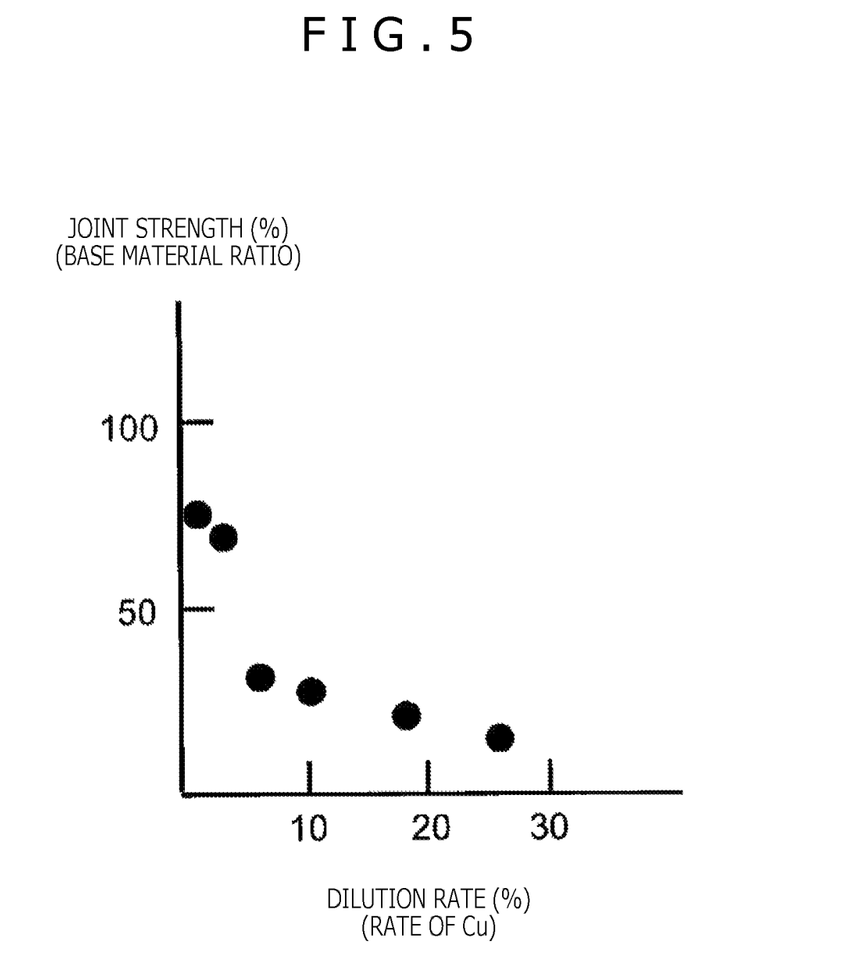
FIG. 5 is a chart illustrating an example of a relationship between a dilution rate and a joint strength.

FIG. 5 is a chart illustrating the relationship between the dilution rate and the joint strength. A horizontal axis represents the dilution rate (%) indicating a Cu ratio in the molten pool 21. This dilution rate is estimated on the basis of the spectroscopic information obtained by the spectroscopic apparatus 5. The relationship between an intensity of an optical spectrum corresponding to Cu and the dilution rate (that is, the relationship shown in FIG. 5) is stored in the welder control section 8 in advance as reference spectroscopic information. The welder control section 8 compares a measured intensity of the optical spectrum corresponding to Cu with the reference spectroscopic information and estimates the dilution rate.

As is clear from FIG. 5, the joint strength is reduced when a content of Cu mixed into the weld metal increases and the joint strength is greatly reduced when the dilution rate is equal to or higher than about 5%. As described above, when the dilution rate is estimated from the spectroscopic information, a strength of the weld zone (that is, property of the weld zone 18) can be estimated from a resultant estimated value and the relationship shown in FIG. 5. Furthermore, similarly to the case of the first embodiment, the soundness of the weld zone 18 can be estimated by determining the dimensions L1 and L2 of the molten pool 21 from the image information by the molten pool observation camera 19 and comparing those dimensions with standard dimensions (dimension ranges for the sound welding).

Figure 6:
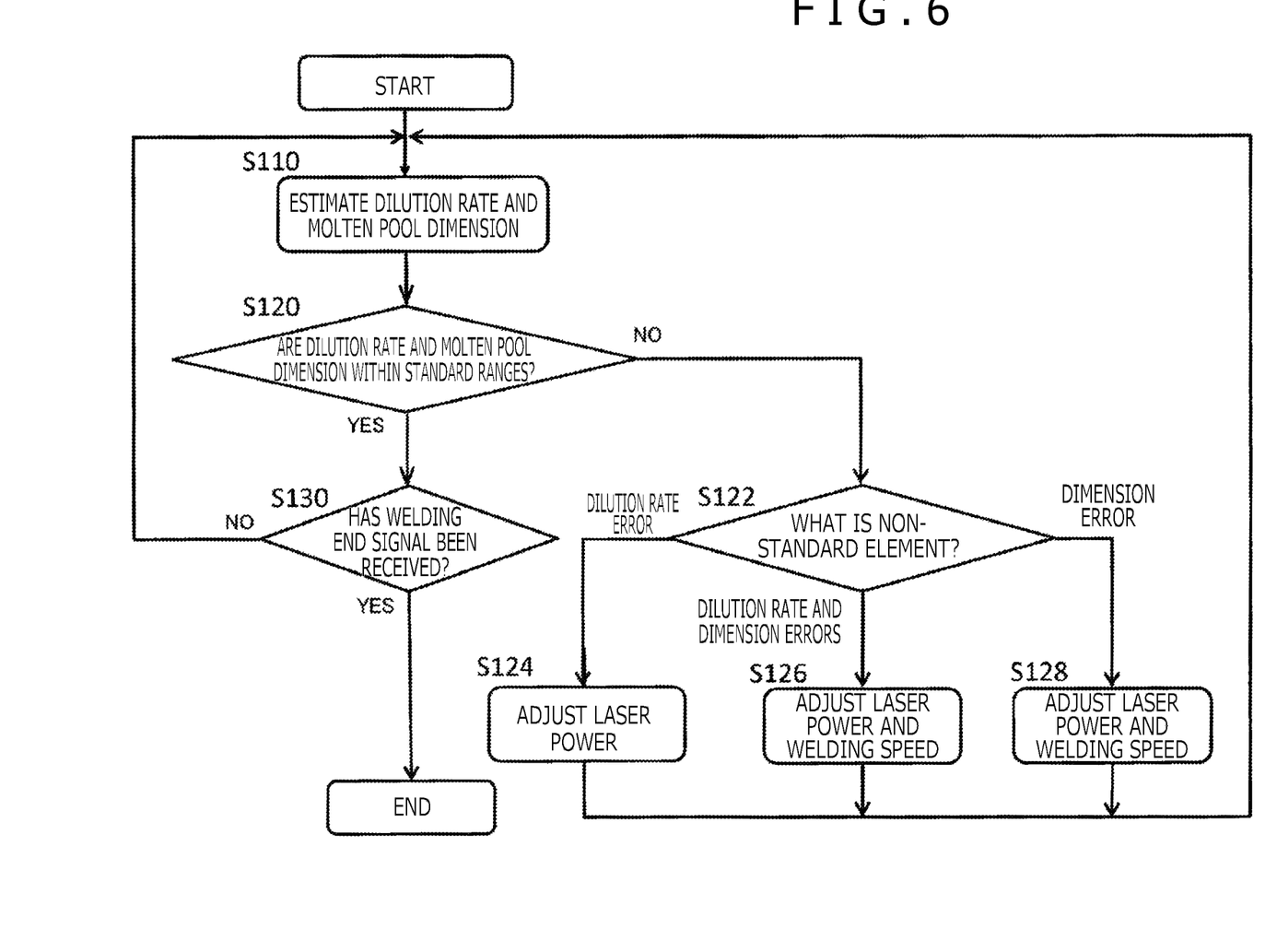
FIG. 6 is a chart illustrating a feedback control flow for keeping optimum the dilution rate and the molten pool dimension.

Moreover, similarly to the case of the first embodiment, it is possible to exercise feedback control over the welding quality using an estimation result. FIG. 6 is a chart illustrating a feedback control flow for keeping optimum the dilution rate and the molten pool dimension. The welder control section 8 stores a management standard value of the dilution rate and the molten pool dimension ranges in advance. For example, the dilution rate of 5% is stored as the management standard value from data of FIG. 5. While the second embodiment is similar to the first embodiment in a basic control concept, the filler metal is not used in the present embodiment. Owing to this, adjustment of the dilution rate is implemented by adjusting the laser power.

In Step S110, the welder control section 8 estimates the dilution rate and the dimensions L1 and L2 of the molten pool 21 on the basis of the spectroscopic information on the plasma beam and the molten pool image information on the molten pool 21. In Step S120, the welder control section 8 determines whether the dilution rate estimated in Step S110 is equal to or lower than the management standard value and whether the dimensions L1 and L2 estimated in Step S110 are within standard ranges.

In Step S120, when the dilution rate is equal to or lower than the management standard value and the dimensions L1 and L2 are within the standard ranges, the welder control section 8 proceeds to Step S130. When at least either the case of the dilution rate being not equal to or lower than the management standard value or the case of the dimensions L1 and L2 being not within the standard ranges, the welder control section 8 proceeds to Step S122. In Step S130, the welder control section 8 determines whether a welding end signal has been received, and the welder control section 8 returns to Step S110 when the signal has not been received. On the other hand, when the welding end signal has been received, the welder control section 8 ends a series of processes.

On the other hand, when proceeding from Step S120 to Step S122, the welder control section 8 determines whether the no-standard (error) element is only the dilution rate, only the dimension, or both the dilution rate and the dimension. In other words, the welder control section 8 classifies an error into any of a dilution rate error, a dimension error, and dilution rate and dimension errors, and adjusts the welding condition in response to each of the errors.

In a case of only the dilution rate error, the welder control section 8 proceeds to Step S124 and adjusts the laser power by a predetermined level. When the laser power is increased, a melt amount of the Cu material that is a lower-side workpiece to be welded increases and the dilution rate increases. Conversely, when the laser power is reduced, the dilution rate decreases. On the other hand, in a case of only the dimension error or in a case in which both the dilution rate and the dimension are not within the standard ranges, the welder control section 8 adjusts either the laser power or the welding speed (scan speed of the laser beam 4) by a predetermined level, thereby adjusting the dilution rate or the dimensions L1 and L2 of the molten pool 21.

When ending processes in Step S124, S126, or S128, the welder control section 8 returns to Step S110 and estimates the dilution rate and the dimensions L1 and L2 of the molten pool 21 after adjustment. Proceeding again to Step S120, the welder control section 8 determines whether the dilution rate and the dimensions L1 and L2 are each within the standard ranges. When there is an error in either the dilution rate or the dimensions L1 and L2, the welder control section 8 proceeds again to Step S122 to perform an adjustment process. On the other hand, when the error is solved by the adjustment, the welder control section 8 proceeds to Step S130.

In this way, even when the welder control section 8 proceeds to Step S124, S126, or S128 and there is still an error after the adjustment, the welder control section 8 operates by a mechanism of repeating feedback control over the welding condition according to error classification. In the present embodiment, similarly to the first embodiment, PID control is used as the feedback control, the ranges of the dilution rate and the molten pool dimension are set in advance to achieve desired welding, and the feedback control is exercised in such a manner that the dilution rate and the molten pool dimension are within the ranges.

Figure 7:
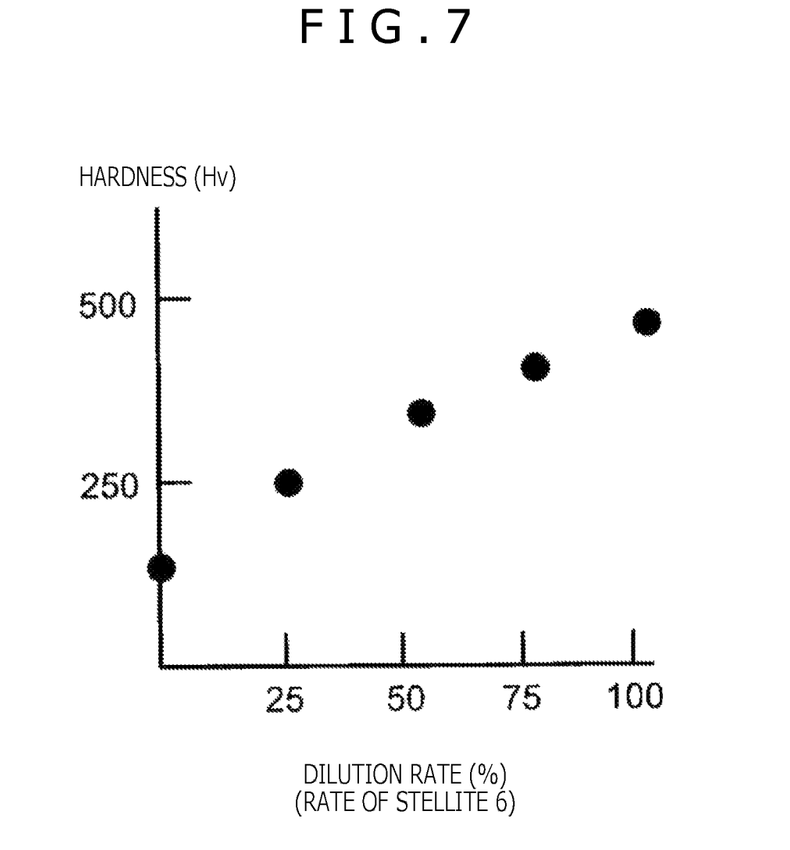
FIG. 7 is a chart illustrating an example of a relationship between the dilution rate and a hardness.

While a case of estimating the dilution rate and managing the strength of the weld zone in the lap welding of the dissimilar metal materials (Al material and Cu material) has been described by way of example above, a form of the dissimilar metal welding is not limited to the case. For example, in a case of build-up welding of stellite 6 on an SS400 material at a hardness of about 120 Hv, a hardness of the weld zone changes depending on a ratio of the stellite 6 as shown in FIG. 7. In such a case, it is also possible to estimate the dilution rate and manage the hardness of the weld zone.

As described so far, in the second embodiment, the welder control section 8 estimates the dilution rate of the weld zone 18 on the basis of the optical spectral information and estimates the property (hot cracking property) of the weld zone 18 from a result of the estimation when the workpieces to be welded 17 dissimilar in the quality of the material are welded together. As a result, similarly to the first embodiment, it is possible to manage not only the soundness of the weld zone 18 estimated from the magnitude of the molten pool 21 but also the hot cracking property of the weld zone 18.

Third Embodiment

In a third embodiment, an example in which the present invention is applied to build-up welding intended to locally control a magnetic property will be described. Examples of such build-up welding include a case in which workpieces to be welded are martensitic stainless steels or ferritic stainless steels and either nickel or nickel alloy is used as a filler metal intended for controlling the magnetic property. The ferritic stainless steels exhibiting the magnetic property are used as the workpieces to be welded 17 and a pure Ni wire is used as the filler metal.

A configuration of a welding apparatus is similar to that shown in FIG. 1 and description thereof is omitted herein. The workpieces to be welded 17 are round bars and pure Ni is build-up welded with the round bars. It is possible to locally change components by build-up welding of pure Ni, and it is possible to control the magnetic property by controlling the ferrite content. In the present embodiment, it is intended to locally reduce the magnetic property.

Figure 8:
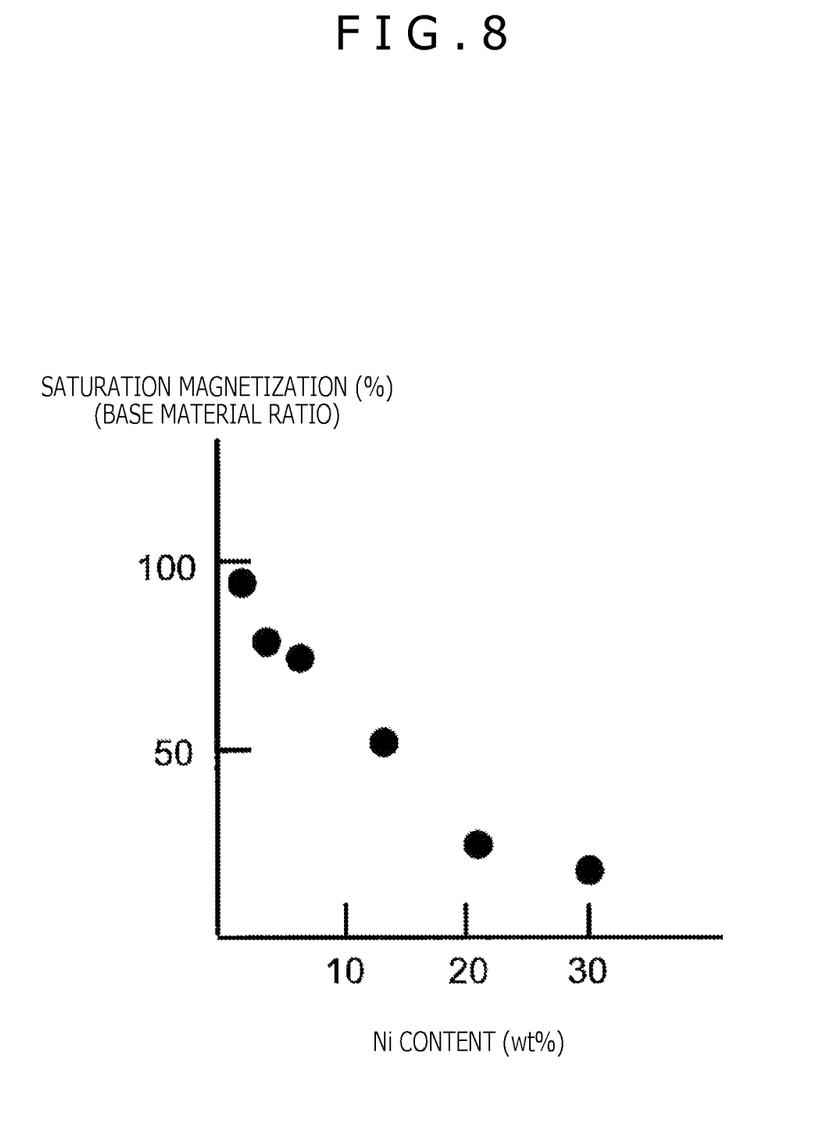
FIG. 8 is a chart illustrating an example of a relationship between an Ni content in a weld metal and a saturation magnetization.

FIG. 8 is a chart illustrating an example of a relationship between an Ni content in the weld metal and a saturation magnetization (base material ratio). It is clear from FIG. 8 that the saturation magnetization decreases as the Ni content increases. By monitoring the Ni content in the weld metal using this relationship, it is possible to manage the magnetic property of the weld metal in an in-process manner. In the present embodiment, the relationship between the Ni content and the saturation magnetization is stored in the storage section of the welder control section 8 in advance and the Ni content is estimated on the basis of the spectroscopic information, thereby managing the magnetic property (saturation magnetization) of the weld zone. The relationship between the Ni content and the saturation magnetization is acquired in advance by conducting a welding test.

Figure 9:
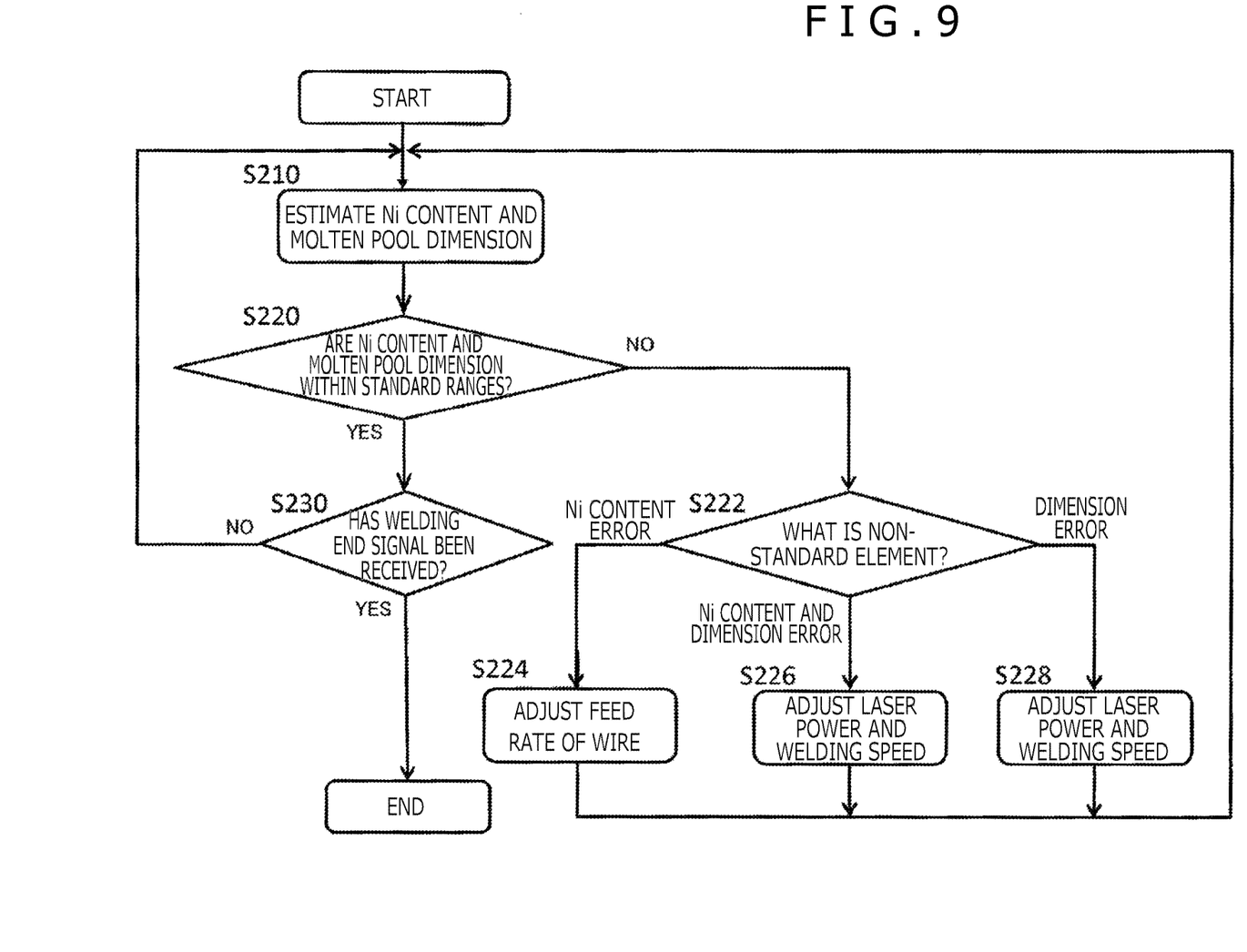
FIG. 9 is a chart illustrating a feedback control flow for keeping optimum the Ni content and the molten pool dimension.

FIG. 9 is a chart illustrating a feedback control flow for keeping optimum the Ni content and the molten pool dimension. The welder control section 8 stores a management standard value of the saturation magnetization and the molten pool dimension ranges in advance. The Ni content is adjusted by adjusting the feed rate of the wire.

In Step S210, the welder control section 8 estimates the Ni content and the dimensions L1 and L2 of the molten pool 21 on the basis of the spectroscopic information on the plasma beam and the molten pool image information on the molten pool 21. In Step S220, the welder control section 8 determines whether the Ni content estimated in Step S210 is equal to or lower than the management standard value and whether the dimensions L1 and L2 estimated in Step S210 are within standard ranges.

In Step S220, when the Ni content is equal to or lower than the management standard value and the dimensions L1 and L2 are within the standard ranges, the welder control section 8 proceeds to Step S230. When at least either the case of the Ni content being not equal to or lower than the management standard value or the case of the dimensions L1 and L2 being not within the standard ranges, the welder control section 8 proceeds to Step S222. In Step S230, the welder control section 8 determines whether a welding end signal has been received, and the welder control section 8 returns to Step S210 when the signal has not been received. On the other hand, when the welding end signal has been received, the welder control section 8 ends a series of processes.

On the other hand, when proceeding from Step S220 to Step S222, the welder control section 8 determines whether the no-standard (error) element is only the Ni content, only the dimension, or both the Ni content and the dimension. In other words, the welder control section 8 classifies an error into any of an Ni content error, a dimension error, and Ni content and dimension errors, and adjusts the welding condition in response to each of the errors.

In a case of only the Ni content error, the welder control section 8 proceeds to Step S224 and adjusts a feed rate of an Ni wire by a predetermined rate. The Ni content in the weld metal increases when the feed rate of the wire is increased, and the Ni content in the weld metal decreases when the feed rate of the wire is reduced. On the other hand, in a case of only the dimension error or in a case in which both the Ni content and the dimension are not within the standard ranges, the welder control section 8 adjusts either the laser power or the welding speed by a predetermined level, thereby adjusting the dimensions L1 and L2 of the molten pool 21.

When ending processes in Step S224, S226, or S228, the welder control section 8 returns to Step S210 and estimates the Ni content and the dimensions L1 and L2 of the molten pool 21 after adjustment. Proceeding again to Step S220, the welder control section 8 determines whether the Ni content is equal to or lower than the management standard value and whether the dimensions L1 and L2 are within the standard ranges. When there is an error in either the Ni content or the dimensions L1 and L2, the welder control section 8 proceeds again to Step S222 to perform an adjustment process. On the other hand, when the error is solved by the adjustment, the welder control section 8 proceeds to Step S230.

In this way, even when the welder control section 8 proceeds to Step S224, S226, or S228 and there is still an error after the adjustment, the welder control section 8 operates by a mechanism of repeating feedback control over the welding condition according to error classification. In the present embodiment, similarly to the preceding embodiments, PID control is used as the feedback control, the ranges of the Ni content and the molten pool dimension are set in advance to achieve desired welding, and the feedback control is exercised in such a manner that the Ni content and the molten pool dimension are within the ranges.

As described so far, in the third embodiment, the welder control section 8 estimates the content of the non-magnetic material in the weld zone 18 and estimates the property of the weld zone 18 from a result of the estimation when the workpieces to be welded 17 of the magnetic material are welded together while supplying the filler metal that is the non-magnetic material. As a result, similarly to the first embodiment, it is possible to manage not only the soundness of the weld zone 18 estimated from the magnitude of the molten pool 21 but also the property (saturation magnetization) of the weld zone 18.

While the various embodiments have been described above, the present invention is not limited to contents of these embodiments. Other possible aspects within the scope of the technical concept of the present invention are also contained in the scope of the present invention.

A disclosure content of the following priority application is incorporated herein by reference.

Japanese Patent Application No. 2015-96319 (filed May 11, 2015)

DESCRIPTION OF REFERENCE CHARACTERS

1: Laser oscillator
3: Laser head
4: Laser beam
5: Spectroscopic apparatus
8: Welder control section
9: Filler metal
11: Filler metal feeder
13: Working table
16: Shielding gas nozzle
17: Workpiece to be welded
18: Weld zone
19: Molten pool observation camera
21: Molten pool
100: Welding apparatus

The invention claimed is:

1. A welding apparatus comprising:
a laser beam irradiation section that emits a laser beam;
a spectroscopic apparatus that receives plasma emission from a molten pool formed by laser beam irradiation, and acquires optical spectral information;
an estimation section that estimates material components of a weld zone on the basis of the optical spectral information, and estimates a property of the weld zone on the basis of the material components; and
a control section that exercises control over a feed rate of an austenitic stainless steel filler metal and either a laser power or a laser beam scanning speed during laser welding in such a manner that a magnitude of the molten pool and a ferrite content are each within predetermined set ranges;
wherein when austenitic stainless steels to be welded are welded together while feeding the austenitic stainless steel filler metal, the estimation section estimates the ferrite content on the basis of the optical spectral information, and estimates a hot cracking property of the weld zone on the basis of the ferrite content; and
wherein the austenitic stainless steel filler metal comprises a chromium content higher than a base material.

2. The welding apparatus according to claim 1, comprising:
a measuring section that measures a magnitude of the molten pool,
wherein the estimation section estimates a failure/no-failure of the weld zone on the basis of the estimated property and a measurement result of the measuring section.

3. The welding apparatus according to claim 2, wherein when workpieces to be welded dissimilar in a quality of a material are welded together, the estimation section estimates a dilution rate at the molten pool on the basis of the optical spectral information, and estimates a strength property of the weld zone on the basis of the dilution rate.

4. The welding apparatus according to claim 3, wherein the control section exercises control over either the laser power or the laser beam scanning speed in such a manner that the magnitude of the molten pool and the dilution rate are each within predetermined set ranges.

5. The welding apparatus according to claim 2, wherein when magnetic materials to be welded are welded together while feeding a non-magnetic filler metal material, the estimation section estimates a content of the non-magnetic filler metal material on the basis of the optical spectral information, and estimates a saturation magnetization of the weld zone on the basis of the content of the non-magnetic filler metal material.

6. The welding apparatus according to claim 5, wherein the control section exercises control over the feed rate of the non-magnetic filler metal material and either the laser power or the laser beam scanning speed during laser welding in such a manner that the magnitude of the molten pool and the content of the non-magnetic filler metal material are each within predetermined set ranges.

7. A welding quality inspection method implemented at a time of welding by a laser beam, the method comprising:
acquiring optical spectral information on a plasma emission generated in a molten pool;
providing an estimation section to estimate material components of the molten pool and a property of a weld zone;
estimating the material components of the molten pool on the basis of the optical spectral information;
estimating the property of the weld zone on the basis of the material components;
providing a control section that exercises control over a feed rate of an austenitic stainless steel filler metal and either a laser power or a laser beam scanning speed during laser welding in such a manner that a magnitude of the molten pool and a ferrite content are each within predetermined set ranges; and controlling the feed rate of the austenitic stainless steel metal filler and either the laser power or the laser beam scanning speed during laser welding in such a manner that the magnitude of the molten pool and the ferrite content are each within the predetermined set ranges;

wherein when austenitic stainless steels to be welded are welded together while feeding the austenitic stainless steel filler metal, the estimation section estimates the ferrite content on the basis of the optical spectral information, and estimates a hot cracking property of the weld zone on the basis of the ferrite content; and wherein the austenitic stainless steel filler metal comprises a chromium content higher than a base material.

8. The welding quality inspection method according to claim 7, comprising providing a measuring section to measure a magnitude of the molten pool;

measuring the magnitude of the molten pool; and estimating a welding quality of the weld zone on the basis of a measurement result of the measuring section and the estimated property of the weld zone.

* * * * *